United States Patent
Ohtani

(10) Patent No.: US 11,015,716 B2
(45) Date of Patent: May 25, 2021

(54) SEALING RING AND TURBOCHARGER

(71) Applicant: IHI Corporation, Koto-ku (JP)

(72) Inventor: Satoshi Ohtani, Tokyo (JP)

(73) Assignee: IHI Corporation, Koto-ku (JP)

( * ) Notice: Subject to any disclaimer, the term of this patent is extended or adjusted under 35 U.S.C. 154(b) by 85 days.

(21) Appl. No.: 16/267,411

(22) Filed: Feb. 5, 2019

(65) Prior Publication Data
US 2019/0170258 A1 Jun. 6, 2019

Related U.S. Application Data

(63) Continuation of application No. PCT/JP2017/032504, filed on Sep. 8, 2017.

(30) Foreign Application Priority Data

Sep. 12, 2016 (JP) .............................. JP2016-177294

(51) Int. Cl.
*F16J 15/34* (2006.01)
*F16J 15/3272* (2016.01)
(Continued)

(52) U.S. Cl.
CPC ......... *F16J 15/3488* (2013.01); *F01D 11/003* (2013.01); *F02C 6/12* (2013.01);
(Continued)

(58) Field of Classification Search
CPC .. F16J 15/3488; F16J 15/3464; F16J 15/3272; F16J 15/3268; F01D 11/003;
(Continued)

(56) References Cited

U.S. PATENT DOCUMENTS 1,986,465 A * 1/1935 Dempsey ................. F02F 11/00
277/632
2,401,279 A * 5/1946 Thorndike .............. B24B 7/165
29/888.075
(Continued)

FOREIGN PATENT DOCUMENTS

CN 2648186 Y 10/2004
CN 101354559 1/2009
(Continued)

OTHER PUBLICATIONS

Extended European Search Report dated Jan. 8, 2020 in European Patent Application No. 17848885.4, 7 pages.
(Continued)

*Primary Examiner* — Nathan Cumar
(74) *Attorney, Agent, or Firm* — Oblon, McClelland, Maier & Neustadt, L.L.P.

(57) ABSTRACT

A sealing ring includes: a main body portion extending from one end to another end in a circumferential direction of a ring hole; and a pair of facing portions separately provided on the one end side and the other end side of the main body portion, the pair of facing portions being in contact with each other while facing each other in a direction of a central axis of the ring hole, the pair of facing portions each subjected to energizing force acting in a direction toward the other.

4 Claims, 4 Drawing Sheets

(51) Int. Cl.
*F01D 11/00* (2006.01)
*F02C 6/12* (2006.01)
*F02B 39/00* (2006.01)

(52) U.S. Cl.
CPC ........... *F16J 15/3272* (2013.01); *F02B 39/00* (2013.01); *F05D 2220/40* (2013.01); *F05D 2240/55* (2013.01); *F05D 2300/10* (2013.01)

(58) Field of Classification Search
CPC .......... F01D 11/00; F01D 11/001; F02C 6/12; F02C 6/00; F02B 6/00; F05D 2220/40; F05D 2220/55; F05D 2300/10
USPC .......................................................... 277/370
See application file for complete search history.

(56) References Cited

U.S. PATENT DOCUMENTS

| | | | |
|---|---|---|---|
| 4,809,646 A | 3/1989 | Paul et al. | |
| 2009/0028600 A1 | 1/2009 | Oda | |
| 2009/0051124 A1* | 2/2009 | Kakehi | F16J 15/3272 277/581 |
| 2015/0115542 A1* | 4/2015 | Neumann | F16J 9/14 277/546 |
| 2016/0305545 A1* | 10/2016 | Okazaki | F16J 9/14 |

FOREIGN PATENT DOCUMENTS

| | | |
|---|---|---|
| CN | 101395412 A | 3/2009 |
| CN | 102282397 A | 12/2011 |
| CN | 202927007 U | 5/2013 |
| CN | 104595491 | 5/2015 |
| DE | 10 2014 221 455 A1 | 4/2015 |
| EP | 2 026 141 A2 | 2/2009 |
| EP | 2 381 144 A1 | 10/2011 |
| JP | 4929355 | 3/1974 |
| JP | 1-503078 | 10/1989 |
| JP | 6-193736 | 7/1994 |
| JP | 8-028291 | 1/1996 |
| JP | 8-74589 | 3/1996 |
| JP | 9-158742 A | 6/1997 |
| JP | 2000-337509 | 12/2000 |
| JP | 2006-083779 | 3/2006 |
| JP | 2007-078041 | 3/2007 |
| JP | 2007-255652 | 10/2007 |
| JP | 2009-031374 | 2/2009 |
| WO | WO 2015/088047 A1 | 6/2015 |

OTHER PUBLICATIONS

International Search Report dated Oct. 3, 2017 in PCT/JP2017/032504 filed on Sep. 8, 2017 (with English Translation).
Combined Chinese Office Action and Search Report dated Jun. 5, 2020, in Patent Application No. 201780047649.0 (with English translation), 11 pages.

* cited by examiner

SEALING RING AND TURBOCHARGER

CROSS REFERENCE TO RELATED APPLICATIONS

This application is a continuation application of International Application No. PCT/JP2017/032504, filed on Sep. 8, 2017, which claims priority to Japanese Patent Application No. 2016-177294, filed on Sep. 12, 2016, the entire contents of which are incorporated by reference herein.

BACKGROUND ART

Technical Field

The present disclosure relates to a sealing ring extending from one end to the other end in the circumferential direction and a turbocharger including the sealing ring.

Related Art

For example, as illustrated in Patent Literature 1, a sealing ring is provided to a shaft of a turbocharger. The main body portion of the sealing ring extends annularly. One end and the other end of the main body portion can be separated (so-called abutment joint). In Patent Literatures 1 and 2, a protrusion and a recess are provided at the abutment joint portion of the sealing ring. The protrusion and the recess fit to each other. The protrusion and the recess improve the sealing performance.

CITATION LIST

Patent Literatures

Patent Literature 1: Japanese Patent Application Laid-Open No. H8-74589
Patent Literature 2: Japanese Patent Application Laid-Open No. JP 2007-255652

SUMMARY

Technical Problem

In the sealing ring disclosed in Patent Literature 1, it is expected that the leakage amount from a gap in the abutment joint can be reduced by the labyrinth effect. There is a problem of further improving the sealing performance. Therefore, a technique for improving the sealing performance of the sealing ring is desired.

It is an object of the present disclosure to provide a sealing ring and a turbocharger capable of improving the sealing performance.

Solution to Problem

In order to solve the above problem, a sealing ring according to one aspect of the present disclosure includes: a main body portion extending from one end to another end in a circumferential direction of a ring hole; and a pair of facing portions separately provided on the one end side and the other end side of the main body portion, the pair of facing portions being in contact with each other while facing each other in a direction of a central axis of the ring hole, the pair of facing portions each subjected to energizing force acting in a direction toward the other.

The sealing ring may further include: a first step portion formed on the one end side of the main body portion and recessed toward one surface side in the direction of the central axis; and a second step portion formed on the other end side of the main body portion and recessed toward another surface side in the direction of the central axis. The facing portions may be separately provided in the first step portion and the second step portion.

One of the facing portions may be a tapered surface inclined from one end of the main body portion toward one surface in the direction of the central axis, and the other facing portion may be a tapered surface inclined from the other end of the main body portion toward the other surface in the direction of the central axis.

In order to solve the above problem, a turbocharger according to one aspect of the present disclosure includes: the sealing ring described above; and a shaft having a part positioned inside the ring hole of the sealing ring and rotating relative to the sealing ring.

Effects of Disclosure

According to the present disclosure, the sealing performance can be improved.

DESCRIPTION OF EMBODIMENTS

An embodiment will be described in detail below with reference to the accompanying drawings. Dimensions, materials, other specific numerical values, and the like illustrated in such embodiments are merely examples for facilitating understanding and do not limit a structure unless specifically mentioned. Note that, in the present specification and drawings, elements having substantially the same function and structure are denoted by the same symbol, and redundant explanations are omitted.

Figure 1:
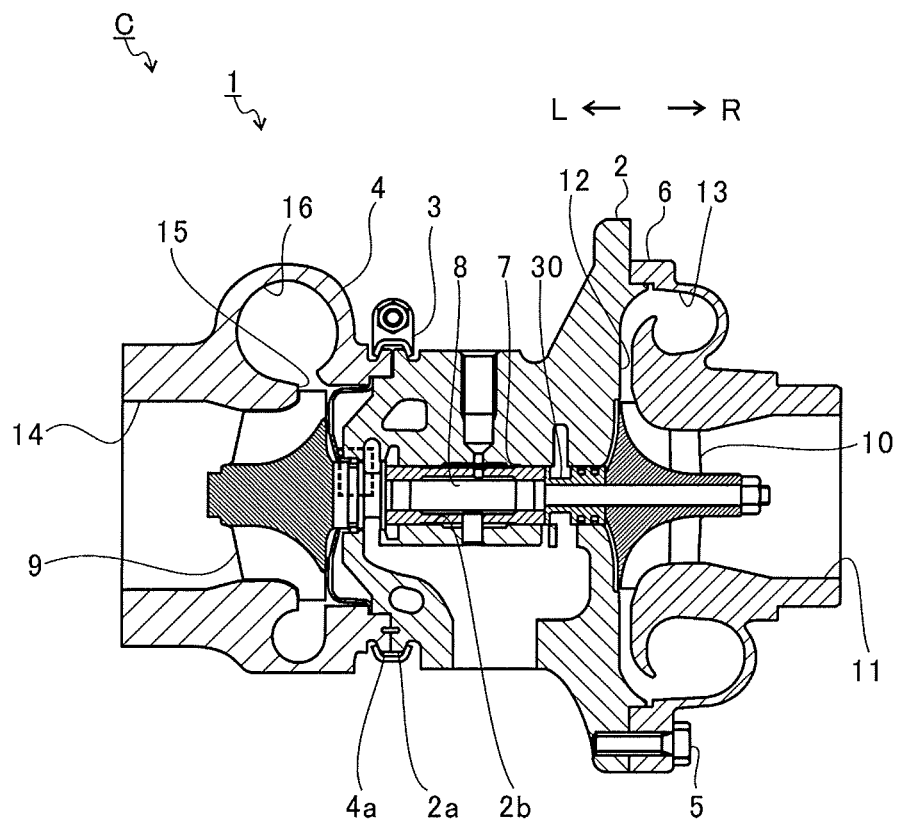
FIG. 1 is a schematic cross-sectional diagram of a turbocharger.

FIG. 1 is a schematic cross-sectional view of a turbocharger C. Hereinafter, descriptions are given assuming that a direction of an arrow L illustrated in FIG. 1 is the left side of the turbocharger C. Descriptions are given assuming that a direction of an arrow R illustrated in FIG. 1 is the right side of the turbocharger C. As illustrated in FIG. 1, the turbocharger C includes a turbocharger main body 1. The turbocharger main body 1 includes a bearing housing 2. A turbine housing 4 is connected to the left side of the bearing housing 2 by a fastening mechanism 3. A compressor housing 6 is connected to the right side of the bearing housing 2 by a fastening bolt 5. The bearing housing 2, the turbine housing 4, and the compressor housing 6 are integrated.

A protrusion 2a is formed on an outer circumferential surface of the bearing housing 2 in the vicinity of the turbine housing 4. The protrusion 2a protrudes in a radial direction of the bearing housing 2. A protrusion 4a is formed on an outer circumferential surface of the turbine housing 4 in the vicinity of the bearing housing 2. The protrusion 4a protrudes in a radial direction of the turbine housing 4. The bearing housing 2 and the turbine housing 4 are attached to each other by fastening the protrusions 2a and 4a by the fastening mechanism 3. The fastening mechanism 3 is formed by, for example, a G coupling which clamps the protrusions 2a and 4a.

A bearing hole 2b is formed in the bearing housing 2. The bearing hole 2b penetrates through the turbocharger C in the left and right direction. In the bearing hole 2b, a semi-floating bearing 7 is provided. A shaft 8 is pivotally supported by the semi-floating bearing 7 in a freely rotatable manner. Here, the case where the semi-floating bearing 7 is provided has been described. However, other bearings such as a full-floating bearing and a rolling bearing may be provided instead of the semi-floating bearing 7.

A turbine impeller 9 is integrally attached to a left end portion of the shaft 8. The turbine impeller 9 is accommodated in the turbine housing 4 in a freely rotatable manner. Moreover, a compressor impeller 10 is integrally attached to a right end portion of the shaft 8. The compressor impeller 10 is accommodated in the compressor housing 6 in a freely rotatable manner.

An intake port 11 is formed in the compressor housing 6. The intake port 11 opens to the right side of the turbocharger C. The intake port 11 is connected to an air cleaner (not illustrated). Opposing surfaces of the bearing housing 2 and the compressor housing 6 form a diffuser flow passage 12. The diffuser flow passage 12 pressurizes the air. The diffuser flow passage 12 is annularly formed outward from an inner side in a radial direction of the shaft 8. The diffuser flow passage 12 communicates with the intake port 11 via the compressor impeller 10 on the inner side in the radial direction.

Furthermore, the compressor housing 6 includes a compressor scroll flow passage 13 having an annular shape. The compressor scroll flow passage 13 is positioned at an outer side in the radial direction of the shaft 8 with respect to the diffuser flow passage 12. The compressor scroll flow passage 13 communicates with an intake port of an engine (not illustrated) and the diffuser flow passage 12. When the compressor impeller 10 rotates, the air is sucked into the compressor housing 6 from the intake port 11. The sucked air is pressurized and accelerated by the action of the centrifugal force in the process of flowing through blades of the compressor impeller 10. The pressurized and accelerated air is further pressurized in the diffuser flow passage 12 and the compressor scroll flow passage 13 and guided to the intake port of the engine.

A discharge port 14 is formed in the turbine housing 4. The discharge port 14 opens to the left side of the turbocharger C. The discharge port 14 is connected to an exhaust gas purification device (not illustrated). In addition, a flow passage 15 is provided in the turbine housing 4. The turbine housing 4 further includes a turbine scroll flow passage 16 having an annular shape. The turbine scroll flow passage 16 is positioned at an outer side in the radial direction of the turbine impeller 9 with respect to the flow passage 15. The turbine scroll flow passage 16 communicates with a gas inlet port (not illustrated). Exhaust gas discharged from an exhaust manifold of the engine (not illustrated) is guided to the gas inlet port. The turbine scroll flow passage 16 communicates also with the flow passage 15. Therefore, the exhaust gas guided from the gas inlet port to the turbine scroll flow passage 16 is guided to the discharge port 14 via the flow passage 15 and the turbine impeller 9. The exhaust gas rotates the turbine impeller 9 in the process of flowing therethrough.

The turning force of the turbine impeller 9 is then transmitted to the compressor impeller 10 via the shaft 8. When the compressor impeller 10 rotates, the air is pressurized and guided to the intake port of the engine as described above.

Figure 2:
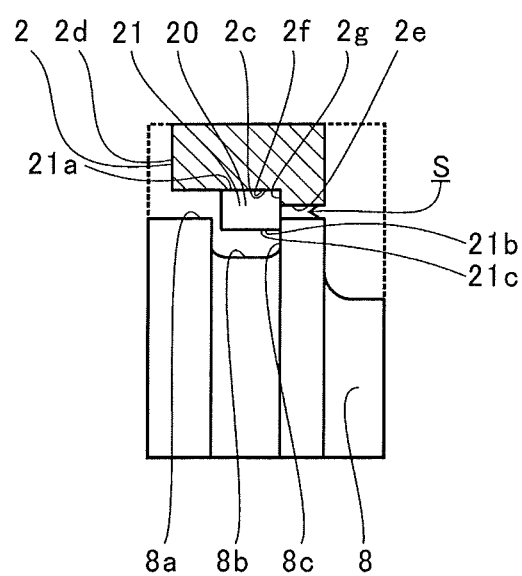
FIG. 2 is a diagram of a broken line part extracted from FIG. 1.

FIG. 2 is a diagram of a broken line part extracted from FIG. 1. As illustrated in FIG. 2, a through hole 2c is formed in the bearing housing 2. The through hole 2c opens to a wall surface 2d. The wall surface 2d is a portion of the bearing housing 2 that is located on the rear surface side of the turbine impeller 9. The shaft 8 is inserted through the through hole 2c.

In the through hole 2c, a small inner diameter portion 2e is formed on the right side (compressor impeller 10 side) in FIG. 2. In the through hole 2c, a large inner diameter portion 2f is formed on the left side (turbine impeller 9 side) in FIG. 2 with respect to the small inner diameter portion 2e. The large inner diameter portion 2f has an inner diameter larger than that of the small inner diameter portion 2e. A step surface 2g extends in the radial direction from the small inner diameter portion 2e to the large inner diameter portion 2f. The step surface 2g connects the small inner diameter portion 2e and the large inner diameter portion 2f.

Inside the through hole 2c, a sealing ring 20 made of metal, for example, is arranged. The sealing ring 20 has a main body portion 21 having an annular shape. The outer diameter of the main body portion 21 is larger than the inner diameter of the small inner diameter portion 2e. The main body portion 21 faces the step surface 2g of the through hole 2c in the axial direction of the shaft 8 from the left in FIG. 2.

A ring hole 21b is formed in the main body portion 21. The shaft 8 is arranged to pass through the ring hole 21b. That is, a part of the shaft 8 is located inside the ring hole 21b. The outer circumferential surface 8a of the shaft 8 is formed with an annular groove 8b. The annular groove 8b is located inside the through hole 2c. The inner circumferential surface 21c of the ring hole 21b is positioned inside the annular groove 8b. That is, the main body portion 21 of the sealing ring 20 faces an inner wall surface 8c of the annular groove 8b, which is on the right side in FIG. 2, from the left in the axial direction of the shaft 8.

The outer diameter of the main body portion 21 is slightly larger than the inner diameter of the large inner diameter portion 2f in a state where no load is applied thereto. When arranged inside the large inner diameter portion 2f, the main body portion 21 receives a compressive load radially inward from the inner circumferential surface of the large inner diameter portion 2f. Therefore, the outer circumferential surface 21a of the main body portion 21 is pressed and held by the inner circumferential surface of the large inner diameter portion 2f. The shaft 8 rotates relative to the sealing ring 20. Here, a gap S between the outer circumferential surface 8*a* of the shaft 8 and the small inner diameter portion 2*e* is sealed by the sealing ring 20.

Figure 3C:
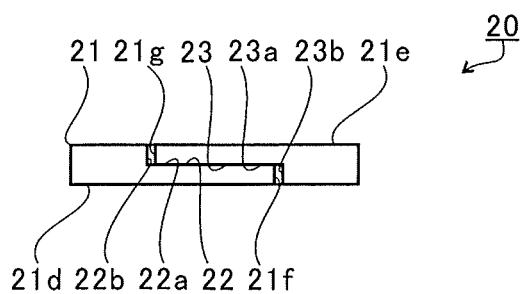
FIG. 3C is a diagram of the sealing ring as viewed from above in FIG. 3A.
Figure 3A:
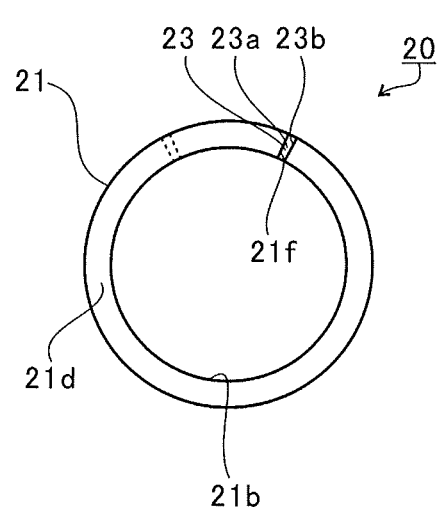
FIG. 3A is a diagram of a sealing ring in which a first surface is facing front. The first surface is one surface of the main body portion in a direction of the central axis of the ring hole.
Figure 3B:
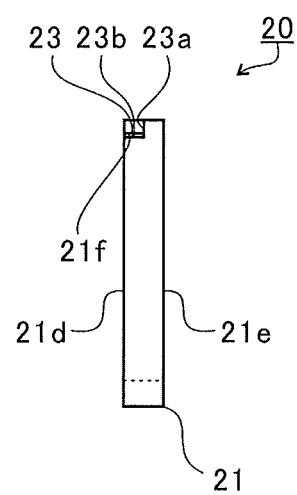
FIG. 3B is a diagram of the sealing ring as viewed from the right in FIG. 3A.

FIG. 3A is a diagram of the sealing ring 20 in which a first surface 21*d* is facing front. The first surface 21*d* is one surface of the main body portion 21 in the direction of the central axis of the ring hole 21*b*. Hereinafter, the "direction of the central axis of the ring hole 21*b*" is simply referred to as the "central axis direction." FIG. 3B is a diagram of the sealing ring 20 as viewed from the right in FIG. 3A. FIG. 3C is a diagram of the sealing ring 20 as viewed from above in FIG. 3A.

As illustrated in FIGS. 3A, 3B, and 3C, the first surface 21*d* and a second surface 21*e* are perpendicular to the central axis direction. The second surface 21*e* is the other surface of the main body portion 21 in the central axis direction. The main body portion 21 extends from one end 21*f* to the other end 21*g* in the circumferential direction of the ring hole 21*b*. The one end 21*f* and the other end 21*g* of the main body portion 21 have a planar shape extending in the central axis direction. A first step portion 22 is formed on the one end 21*f* side of the main body portion 21. On the other end 21*g* side of the main body portion 21, a second step portion 23 is formed.

The first step portion 22 is a portion recessed from the second surface 21*e* of the main body portion 21 toward the first surface 21*d*. In other words, the first step portion 22 is a portion of the one end 21*f* of the main body portion 21 on the second surface 21*e* side that is recessed in the circumferential direction of the ring hole 21*b*. At the first step portion 22, the other end 21*g* of the main body portion 21 is positioned.

The first step portion 22 has a first facing portion 22*a* and a first step surface 22*b*. The first facing portion 22*a* is a surface parallel to the first surface 21*d*. The first facing portion 22*a* faces and is in contact with a second facing portion 23*a*, which will be described later, in the central axis direction. The first step surface 22*b* extends in the central axis direction from the second surface 21*e* to the first facing portion 22*a*. For example, the first step surface 22*b* extends to the center position of the thickness of the main body portion 21 in the central axis direction.

The other end 21*g* of the main body portion 21 faces the first step surface 22*b* in the circumferential direction of the ring hole 21*b*. The other end 21*g* and the first step surface 22*b* are spaced apart in the circumferential direction of the ring hole 21*b*. The first step surface 22*b* and the other end 21*g* are substantially parallel to each other. Here, the case where the first step surface 22*b* and the other end 21*g* extend in the central axis direction has been described. However, the first step surface 22*b* and the other end 21*g* may extend while inclined with respect to the central axis direction.

The second step portion 23 is a portion recessed from the first surface 21*d* of the main body portion 21 toward the second surface 21*e*. In other words, the second step portion 23 is a portion of the other end 21*g* of the main body portion 21 on the first surface 21*d* side that is recessed in the circumferential direction of the ring hole 21*b*. At the second step portion 23, the one end 21*f* of the main body portion 21 is positioned.

The second step portion 23 has a second facing portion 23*a* and a second step surface 23*b*. The second facing portion 23*a* is a surface parallel to the first surface 21*d*. That is, the second facing portion 23*a* is parallel to the first facing portion 22*a* described above. The second facing portion 23*a* faces and is in contact with the first facing portion 22*a* in the central axis direction. The second step surface 23*b* extends from the first surface 21*d* to the second facing portion 23*a* in the central axis direction. For example, the second step surface 23*b* extends to the center position of the thickness of the main body portion 21 in the central axis direction.

The one end 21*f* of the main body portion 21 faces the second step surface 23*b* in the circumferential direction of the ring hole 21*b*. The one end 21*f* and the second step surface 23*b* are spaced apart in the circumferential direction of the ring hole 21*b*. The second step surface 23*b* and the one end 21*f* are substantially parallel to each other. Here, the case where the second step surface 23*b* and the one end 21*f* extend in the central axis direction has been described. However, the second step surface 23*b* and the one end 21*f* may extend while inclined with respect to the central axis direction.

The first facing portion 22*a* and the second facing portion 23*a* are positioned at the center of the thickness of the main body portion 21 in the central axis direction. Therefore, the shapes of the first step portion 22 and the second step portion 23 are symmetrical to each other. As a result, it is possible to form the first step portion 22 and the second step portion 23 under substantially the same processing condition. Moreover, even when the first surface 21*d* and the second surface 21*e* of the sealing ring 20 are reversed in direction and attached to the through hole 2*c*, the same performance is exhibited.

Here, the case where the first facing portion 22*a* and the second facing portion 23*a* are positioned at the center of the thickness of the main body portion 21 in the central axis direction has been described. However, the first facing portion 22*a* and the second facing portion 23*a* may be positioned closer to the first surface 21*d* or closer to the second surface 21*e* from the central position of the thickness of the main body portion 21 in the central axis direction.

Furthermore, as described above, the other end 21*g* and the first step surface 22*b* are spaced apart in the circumferential direction of the ring hole 21*b*. The one end 21*f* and the second step surface 23*b* are spaced apart in the circumferential direction of the ring hole 21*b*. After assembly to the bearing housing 2, the main body portion 21 receives a compressive load radially inward from the inner circumferential surface of the large inner diameter portion 2*f*. At this time, the main body portion 21 can be deformed into a direction in which each pair of the other end 21*g* and the first step surface 22*b* and the one end 21*f* and the second step surface 23*b* come close to each other. Therefore, the main body portion 21 is reduced in diameter with little flection in the central axis direction.

As described above, a so-called abutment joint is formed in the main body portion 21. Furthermore, in the main body portion 21, the first facing portion 22*a* and the second facing portion 23*a* are in contact with each other to form an annular shape. Meanwhile, for example, if the first facing portion 22*a* and the second facing portion 23*a* are spaced apart in the central axis direction, the sealing performance is deteriorated. Therefore, in the present embodiment, energizing force (self-closing force, elastic force) acts on the first facing portion 22*a* and the second facing portion 23*a* such that the first and second facing portions are not spaced apart from each other. Hereinafter, an exemplary manufacturing process of the sealing ring 20 applied with such energizing force will be described.

First, a wire rod is roughly worked into the shape illustrated in FIG. 3. Then, for example, the main body portion 21 is twisted by a jig or the like to allow the main body portion 21 to be deformed into the shape illustrated in FIGS. 4A, 4B and 4C.

Figure 4C:
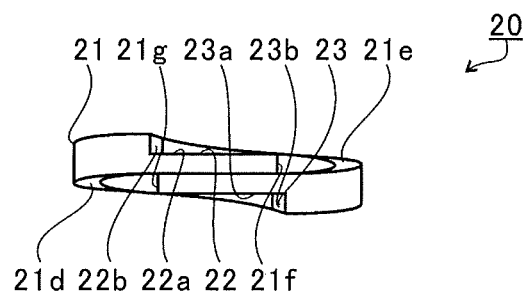
FIG. 4C is a diagram of the sealing ring in the manufacturing process as viewed from above in FIG. 4A.
Figure 4A:
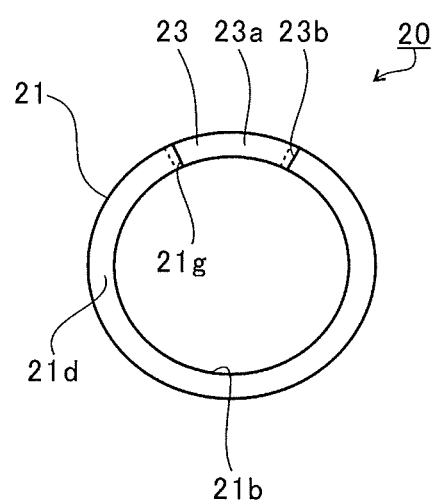
FIG. 4A is a diagram of the sealing ring in a manufacturing process in which the first surface is facing front.
Figure 4B:
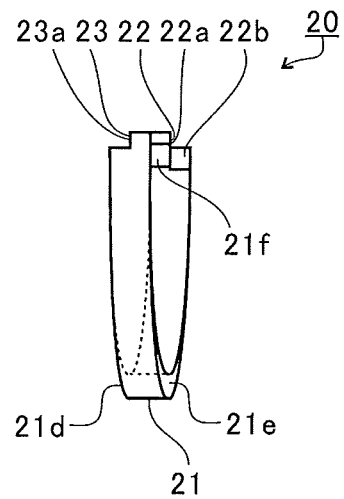
FIG. 4B is a diagram of the sealing ring in the manufacturing process as viewed from the right in FIG. 4A.

FIG. 4A is a diagram of the sealing ring 20 in the manufacturing process in which the first surface 21d is facing front. FIG. 4B is a diagram of the sealing ring 20 in the manufacturing process as viewed from the right in FIG. 4A. FIG. 4C is a diagram of the sealing ring 20 in the manufacturing process as viewed from above in FIG. 4A.

As illustrated in FIGS. 4A, 4B, and 4C, the main body portion 21 is twisted in a direction in which the first surface 21d and the second surface 21e are inclined in a spiral shape. In other words, the one end 21f of the main body portion 21 is not positioned at the second step portion 23. The other end 21g is not positioned at the first step portion 22. The main body portion 21 is deformed such that a portion of the second surface 21e on the back side of the second facing portion 23a and a portion of the first surface 21d on the back side of the first facing portion 22a are facing and being in contact with each other in the central axis direction.

The sealing ring 20 is quenched while being in the deformed (plastic deformation) state as the above. By performing quenching, residual stress (residual strain) of the sealing ring 20 is substantially eliminated. Therefore, when the main body portion 21 is deformed from the shape illustrated in FIGS. 4A, 4B and 4C, elastic force is generated in the main body portion 21 in a direction to return to the shape illustrated in FIGS. 4A, 4B, and 4C. After the quenching treatment, the first surface 21d and the second surface 21e are twisted in a direction opposite to that of the main body portion 21 before being quenched to allow the main body portion 21 to return to the shape illustrated in FIGS. 3A, 3B, and 3C.

Moreover, the first surface 21d and the second surface 21e of the main body portion 21 are polished. As a result, when the first surface 21d and the second surface 21e come into contact with opposing surfaces thereof, a contact area increases. This improves the sealing performance.

Here, the case where polishing processing is performed on both the first surface 21d and the second surface 21e of the main body portion 21 has been described. However, for example, it is also possible to assume a case where the sealing ring 20 is pressed toward the compressor impeller 10 while barely pressed toward the turbine impeller 9. In this case, polishing may be performed only on one of the first surface 21d and the second surface 21e of the main body portion 21 that faces the step surface 2g and the inner wall surface 8c (see FIG. 2). In this case, the processing cost of polishing process can be reduced. However, equivalent performance is demonstrated even when installing the reversed orientations of the first surface 21d and the second surface 21e by performing polishing process on both of the first surface 21d and the second surface 21e.

Figure 5:
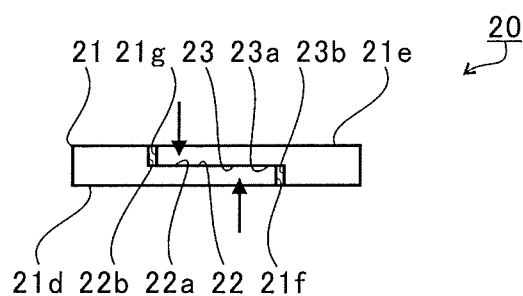
FIG. 5 is a diagram for explaining an elastic force acting on a first facing portion and a second facing portion.

FIG. 5 is a diagram for explaining the elastic force acting on the first facing portion 22a and the second facing portion 23a. FIG. 5 illustrates the same part of the main body portion 21 of the sealing ring 20 as that of FIG. 3C. According to the amount deformed from the shape illustrated in FIGS. 4A, 4B, and 4C, in the main body portion 21, the elastic force is generated in a direction to return to the shape illustrated in FIGS. 4A, 4B, and 4C. As a result, energizing force (elastic force) acts on the first facing portion 22a and the second facing portion 23a in directions to approach each other as indicated by arrows in FIG. 5.

Therefore, even when there is a gap in the abutment joint of the sealing ring 20, the first facing portion 22a and the second facing portion 23a are brought into pressure contact by the energizing force. This allows a leakage gap to be as small as possible. Therefore, the sealing performance is improved.

Furthermore, the first facing portion 22a and the second facing portion 23a are parallel to the first surface 21d and the second surface 21e. That is, the first facing portion 22a and the second facing portion 23a are perpendicular to the central axis direction. For example, it is assumed that relative positions of the first facing portion 22a and the second facing portion 23a are shifted in the circumferential direction of the ring hole 21b due to the main body portion 21 subjected to a compressive load in a direction in which the diameter is reduced. In this case, the one end 21f and the other end 21g move in the circumferential direction of the ring hole 21b. The one end 21f and the other end 21g do not move in a direction to protrude toward the first surface 21d or the second surface 21e. This results in, for example, easier polishing process of the first surface 21d and the second surface 21e. This enables improvement in the dimensional accuracy.

Figure 6A:
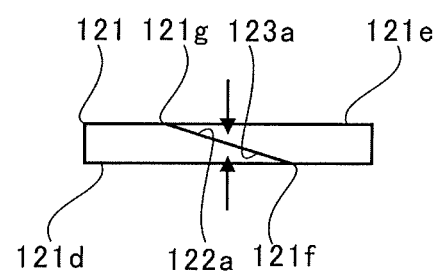
FIG. 6A is a diagram of a first variation at a position corresponding to that of FIG. 3C.
Figure 6B:
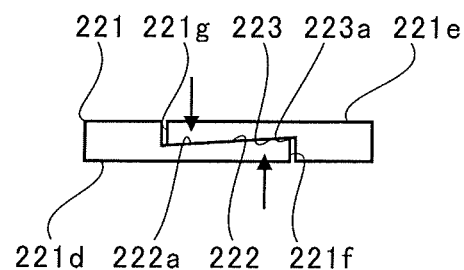
FIG. 6B is a diagram of a second variation at a position corresponding to that of FIG. 3C.
Figure 6C:
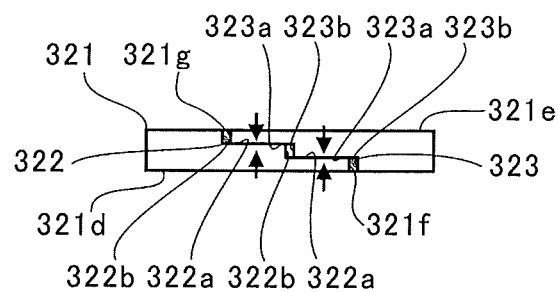
FIG. 6C is a diagram of a third variation at a position corresponding to that of FIG. 3C.

FIG. 6A is a diagram of a first variation at a position corresponding to that of FIG. 3C. FIG. 6B is a diagram of a second variation at a position corresponding to that of FIG. 3C. FIG. 6C is a diagram of a third variation at a position corresponding to that of FIG. 3C.

As illustrated in FIG. 6A, in the first variation, a first facing portion 122a is tapered. The first facing portion 122a is inclined in a direction so as to be apart from a first surface 121d and to approach a second surface 121e as the first facing portion 122a extends apart from one end 121f of a main body portion 121. The one end 121f is positioned at the first surface 121d side.

A second facing portion 123a is a tapered surface parallel to the first facing portion 122a. The second facing portion 123a is inclined in a direction so as to be apart from the second surface 121e and to approach the first surface 121d as the second facing portion 123a extends apart from the other end 121g of the main body portion 121. The other end 121g is positioned at the second surface 121e side.

Alternatively as illustrated in FIG. 6B, in the second variation, a first facing portion 222a is tapered. The first facing portion 222a is inclined in a direction so as to approach a first surface 221d and to be apart from a second surface 221e as the first facing portion 222a extends apart from one end 221f of a main body portion 221.

A second facing portion 223a is a tapered surface parallel to the first facing portion 222a. The second facing portion 223a is inclined in a direction so as to approach the second surface 221e and to be apart from the first surface 221d as the second facing portion 223a extends apart from the other end 221g of the main body portion 221. The widths of a first step portion 222 and a second step portion 223 in the central axis direction are thickened toward the tips (one end 221f and the other end 221g).

As in the first and second variations, the first facing portions 122a and 222a and the second facing portions 123a and 223a may be tapered surfaces.

Furthermore as illustrated in FIG. 6C, in the third variation, a first step portion 322 and a second step portion 323 each have two steps. Specifically, the first step portion 322 has two of first facing portions 322a and two of first step surfaces 322b. The first facing portions 322a and the first step surfaces 322b are alternately formed.

The second step portion 323 has two of second facing portions 323a and two of second step surfaces 323b. The second facing portions 323a and the second step surfaces 323b are alternately formed. Then, two of the first facing portions 322a and two of the second facing portions 323a are in contact with each other while facing each other in the central axis direction.

The first step surfaces 322b on a second surface 321e side and the other end 321g are spaced apart in the circumferential direction of a ring hole 21b. Moreover, the second step surface 323b on a first surface 321d side and one end 321f are spaced apart in the circumferential direction of the ring hole 21b. The first step surfaces 322b and the second step surface 323b positioned in the center of the thickness in the central axis direction in a main body portion 321 are spaced apart in the circumferential direction of the ring hole 21b.

In the first to third variations, the first facing portions 122a, 222a, 322a and the second facing portions 123a, 223a, 323a are in contact with each other while facing each other in the central axis direction like in the embodiment described above. Moreover, elastic force acts on the first facing portions 122a, 222a, 322a and the second facing portions 123a, 223a, 323a in directions to approach each other. Therefore, the gap at the abutment joint of the sealing ring 20 is unlikely to open. This enables the sealing performance to be improved.

Although the embodiments of the present disclosure have been described with reference to the accompanying drawings, it is naturally understood that each configuration is not limited to the above embodiments. It is clear that those skilled in the art can conceive various modifications or variations within the scope described in the claims, and it is understood that they are naturally also within the technical scope of the present disclosure.

For example in the above-described embodiment and the first to third variations, the case where quenching is performed on the sealing ring 20 has been described. However, even by only plastically deforming the sealing ring 20, the above energizing force is applied to the main body portions 21, 121, 221, 321. Therefore, quenching is not an indispensable step depending on a temperature condition under which the sealing ring 20 is used. However, for example when the sealing ring 20 is used in a high-temperature environment and subjected to the high temperature while being in the shape as illustrated in FIGS. 3A, 3B, and 3C, the residual stress is eliminated, and the energizing force is thus lost. By performing quenching, a range of temperature in which the sealing ring 20 can be used can be expanded.

Furthermore, in the above-described embodiment and the first to third variations, the case where the sealing ring 20 is provided in the through hole 2c of the bearing housing 2 (sealing on the turbine impeller side) has been described. However, the sealing ring 20 may be arranged between an oil thrower member 30 (see FIG. 1) and the bearing housing 2 (sealing on the compressor impeller side). In the related art, two sealing rings are required between the oil thrower member 30 and the bearing housing 2. However, the sealing ring 20 described above has an improved sealing performance. Therefore, depending on operating conditions, it can be expected that the number of sealing rings 20 to be arranged can be reduced to one.

Meanwhile, in variable-capacity turbochargers (VGSs) or turbochargers mounted with a valve for opening and closing a wastegate, a drive shaft which rotates to open or close valves is provided. The drive shaft is pivotally supported while inserted through, for example, a cylindrical bearing member. In order to suppress gas leakage from a gap between the bearing member and the drive shaft, sealing rings are provided on the outer circumference of the drive shaft (the inner circumference of the bearing member). Here, one of the sealing rings 20 of the above-described embodiment and the first to third variations may be provided.

Alternatively, for example, there is a case where a sealing ring moves integrally with a piston as in a sealing ring provided to a piston. As compared to such sealing rings, the sealing rings 20 are more likely to exhibit effects in the devices in which the shafts 8 relatively rotate as in the above-described embodiment and the first to third variations.

INDUSTRIAL APPLICABILITY

The present disclosure can be applied to a sealing ring extending from one end to the other end in the circumferential direction and a turbocharger including the sealing ring.

What is claimed is:

1. A sealing ring comprising:
a main body portion extending from a first end to a second end in a circumferential direction of a ring hole; and
first and second facing portions separately provided on a first end side and a second end side of the main body portion, the first and second facing portions being in contact with each other while facing each other in a direction of a central axis of the ring hole, each of the first and second facing portions being subjected to an axial self-closing force acting in a direction toward each other without receiving an axial external force;
wherein the first end side and the second end side of the main body portion extend in the direction of the central axis; and
a shaft of a turbocharger having a part positioned inside the ring hole of the sealing ring and rotating relative to the sealing ring.

2. The sealing ring according to claim 1, further comprising:
a first step portion formed on the first end side of the main body portion and recessed toward a first surface side in the direction of the central axis; and
a second step portion formed on the second end side of the main body portion and recessed toward a second surface side in the direction of the central axis,
wherein the first and second facing portions are separately provided in the first step portion and the second step portion.

3. The sealing ring according to claim 2,
wherein the first facing portion is a tapered surface inclined from the first end of the main body portion toward the first surface in the direction of the central axis, and
wherein the second facing portion is a tapered surface inclined from the second end of the main body portion toward the second surface in the direction of the central axis.

4. The sealing ring according to claim 2,
wherein the first step portion includes a first step surface extending in the direction of the central axis from the second surface to the first facing portion, the first step surface facing and being spaced apart from the second end of the main body portion in the circumferential direction of the ring hole, and
wherein the second step portion includes a second step surface extending in the direction of the central axis from the first surface to the second facing portion, the second step surface facing and being spaced apart from the first end of the main body portion in the circumferential direction of the ring hole.

* * * * *